(12) United States Patent
Yang et al.

(10) Patent No.: US 10,732,127 B2
(45) Date of Patent: Aug. 4, 2020

(54) DIRTINESS LEVEL DETERMINING SYSTEM AND SURFACE CLEANING MACHINE

(71) Applicant: PixArt Imaging Inc., Hsin-Chu (TW)

(72) Inventors: Chung-Ting Yang, Hsin-Chu (TW); Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/233,043

(22) Filed: Dec. 26, 2018

(65) Prior Publication Data

US 2019/0128821 A1    May 2, 2019

Related U.S. Application Data

(63) Continuation-in-part of application No. 15/427,067, filed on Feb. 8, 2017, now Pat. No. 10,198,088.

(30) Foreign Application Priority Data

Oct. 26, 2016  (TW) .............................. 105134530 A

(51) Int. Cl.
   *A47L 11/20*    (2006.01)
   *A47L 11/24*    (2006.01)
   (Continued)

(52) U.S. Cl.
   CPC ............ *G01N 21/94* (2013.01); *A47L 9/2826* (2013.01); *A47L 9/2852* (2013.01); *A47L 9/2857* (2013.01); *G06F 3/0317* (2013.01); *G06F 3/0383* (2013.01); *G06F 3/03543* (2013.01); *G06F 3/042* (2013.01); *G06T 7/0002* (2013.01);
   (Continued)

(58) Field of Classification Search
   CPC .. G06F 3/0304; G06F 3/0317; G06F 3/03543; G06F 3/0383; G06F 3/042; G06K 9/00664; A47L 9/2826; A47L 9/2852; A47L 9/2857; A47L 2201/00; A47L 2201/04; A47L 2201/06; B25J 9/0003; G08B 21/24; G06T 7/0002; G06T 2207/30168; G01N 21/94; G01N 2201/127; G01N 2201/0612; G01N 2201/062; Y10S 901/01; Y10S 901/46
   See application file for complete search history.

(56) References Cited

U.S. PATENT DOCUMENTS 6,661,239 B1 * 12/2003 Ozick .................. G01D 5/2405
                                                  324/658
10,463,217 B1 * 11/2019 Bialek .................. A47L 9/2815
(Continued)

*Primary Examiner* — Michael J Eurice
(74) *Attorney, Agent, or Firm* — Winston Hsu

(57) ABSTRACT

A dirtiness level determining system of a surface cleaning machine, comprising: an optical information generating circuit, configured to generate optical information; a feature level determining circuit, configured to determine an optical feature level of the optical information; and a reminding message generating circuit, configured to generate at least one dirtiness level reminding message according to a relation between the optical feature level and a feature threshold level; wherein the dirtiness level reminding message is adapted to indicate a cleaning status of the cleaning surface, and the cleaning status includes at least one parameter of: a dirtiness level of the cleaning surface, a dirtiness location of the cleaning surface, and an air quality of a room where the cleaning surface locates in.

21 Claims, 9 Drawing Sheets

(51) Int. Cl.

| | | |
|---|---|---|
| G01N 21/94 | (2006.01) | |
| G06T 7/00 | (2017.01) | |
| G08B 21/24 | (2006.01) | |
| A47L 9/28 | (2006.01) | |
| G06F 3/0354 | (2013.01) | |
| G06F 3/042 | (2006.01) | |
| G06F 3/03 | (2006.01) | |
| G06F 3/038 | (2013.01) | |

(52) U.S. Cl.
CPC .......... *G08B 21/24* (2013.01); *A47L 2201/04* (2013.01); *A47L 2201/06* (2013.01); *G01N 2201/062* (2013.01); *G01N 2201/0612* (2013.01); *G01N 2201/127* (2013.01); *G06F 3/0304* (2013.01); *G06T 2207/30168* (2013.01)

(56) References Cited

U.S. PATENT DOCUMENTS

| | | | | |
|---|---|---|---|---|
| 2003/0025472 A1* | 2/2003 | Jones | G05D 1/0219 | 318/568.12 |
| 2003/0060928 A1* | 3/2003 | Abramson | A47L 5/22 | 700/245 |
| 2003/0120389 A1* | 6/2003 | Abramson | A47L 5/22 | 700/245 |
| 2004/0049877 A1* | 3/2004 | Jones | A47L 5/30 | 15/319 |
| 2005/0162119 A1* | 7/2005 | Landry | A47L 9/2805 | 318/580 |
| 2006/0190133 A1* | 8/2006 | Konandreas | A22C 17/0013 | 700/245 |
| 2006/0190134 A1* | 8/2006 | Ziegler | A22C 17/0013 | 700/245 |
| 2006/0190146 A1* | 8/2006 | Morse | A47L 5/14 | 701/23 |
| 2006/0255152 A1* | 11/2006 | Xie | G06F 3/0317 | 235/472.01 |
| 2007/0213892 A1* | 9/2007 | Jones | A47L 11/00 | 701/23 |
| 2007/0234492 A1* | 10/2007 | Svendsen | A47L 5/30 | 15/21.1 |
| 2007/0262243 A1* | 11/2007 | cheah | G06F 1/3215 | 250/214 R |
| 2007/0266508 A1* | 11/2007 | Jones | A47L 9/2852 | 15/49.1 |
| 2007/0285041 A1* | 12/2007 | Jones | G05D 1/0219 | 318/568.12 |
| 2008/0133052 A1* | 6/2008 | Jones | B25J 5/007 | 700/245 |
| 2008/0134458 A1* | 6/2008 | Ziegler | A47L 5/14 | 15/320 |
| 2008/0276407 A1* | 11/2008 | Schnittman | A47L 11/34 | 15/319 |
| 2010/0037418 A1* | 2/2010 | Hussey | A47L 5/30 | 15/319 |
| 2010/0049364 A1* | 2/2010 | Landry | G05D 1/0272 | 700/245 |
| 2010/0063628 A1* | 3/2010 | Landry | G05D 1/0272 | 700/258 |
| 2010/0268385 A1* | 10/2010 | Rew | G05D 1/0253 | 700/259 |
| 2010/0287717 A1* | 11/2010 | Jang | A47L 9/009 | 15/41.1 |
| 2012/0169497 A1* | 7/2012 | Schnittman | A47L 9/2894 | 340/540 |
| 2012/0173070 A1* | 7/2012 | Schnittman | G05D 1/0227 | 701/26 |
| 2012/0199006 A1* | 8/2012 | Swett | A47L 9/106 | 96/417 |
| 2012/0311810 A1* | 12/2012 | Gilbert, Jr. | A47L 11/408 | 15/320 |
| 2013/0145572 A1* | 6/2013 | Schregardus | A47L 11/4036 | 15/319 |
| 2013/0241217 A1* | 9/2013 | Hickey | B60R 19/483 | 293/117 |
| 2013/0331988 A1* | 12/2013 | Goel | G05D 1/0268 | 700/254 |
| 2014/0124004 A1* | 5/2014 | Rosenstein | A47L 9/2852 | 134/18 |
| 2014/0129027 A1* | 5/2014 | Schnittman | G05D 1/0219 | 700/253 |
| 2014/0182627 A1* | 7/2014 | Williams | A47L 11/30 | 134/21 |
| 2014/0188325 A1* | 7/2014 | Johnson | G05D 1/024 | 701/26 |
| 2014/0207280 A1* | 7/2014 | Duffley | A47L 9/2857 | 700/257 |
| 2014/0207281 A1* | 7/2014 | Angle | H04L 12/282 | 700/257 |
| 2014/0207282 A1* | 7/2014 | Angle | G05B 15/02 | 700/257 |
| 2014/0222279 A1* | 8/2014 | Stout | G05D 1/0219 | 701/25 |
| 2014/0259475 A1* | 9/2014 | Doughty | A47L 9/0477 | 15/52.1 |
| 2014/0289983 A1* | 10/2014 | Gilbert, Jr. | A47L 11/4063 | 15/207.2 |
| 2014/0350839 A1* | 11/2014 | Pack | G01C 21/30 | 701/409 |
| 2015/0128996 A1* | 5/2015 | Dooley | A47L 11/125 | 134/6 |
| 2015/0166060 A1* | 6/2015 | Smith | B60W 30/09 | 701/23 |
| 2015/0197012 A1* | 7/2015 | Schnittman | G05D 1/0227 | 700/250 |
| 2015/0271991 A1* | 10/2015 | Balutis | G05D 1/021 | 700/264 |
| 2015/0328775 A1* | 11/2015 | Shamlian | B25J 9/1676 | 700/258 |
| 2016/0100521 A1* | 4/2016 | Halloran | A01D 34/008 | 180/169 |
| 2016/0103451 A1* | 4/2016 | Vicenti | G05D 1/0242 | 700/259 |
| 2016/0144505 A1* | 5/2016 | Fong | B25J 9/1697 | 700/250 |
| 2016/0144511 A1* | 5/2016 | Romanov | B25J 9/1697 | 701/28 |
| 2016/0147230 A1* | 5/2016 | Munich | G05D 1/0246 | 701/28 |
| 2016/0166127 A1* | 6/2016 | Lewis | A47L 9/0488 | 15/49.1 |
| 2016/0167226 A1* | 6/2016 | Schnittman | B25J 5/00 | 382/153 |
| 2016/0235270 A1* | 8/2016 | Santini | A47L 9/0411 | |
| 2016/0270618 A1* | 9/2016 | Lu | A47L 9/2805 | |
| 2016/0271795 A1* | 9/2016 | Vicenti | B25J 9/163 | |
| 2017/0023947 A1* | 1/2017 | McMillion | B64D 1/22 | |
| 2017/0057081 A1* | 3/2017 | Krohne | B25J 9/0084 | |
| 2017/0203446 A1* | 7/2017 | Dooley | H04N 5/23206 | |
| 2017/0296021 A1* | 10/2017 | Li | A47L 9/122 | |
| 2018/0004217 A1* | 1/2018 | Biber | G05D 1/0221 | |
| 2018/0050634 A1* | 2/2018 | White | A47L 9/106 | |
| 2018/0074508 A1* | 3/2018 | Kleiner | A47L 9/2857 | |
| 2018/0116478 A1* | 5/2018 | Lewis | A47L 9/009 | |
| 2018/0168417 A1* | 6/2018 | Goddard | A47L 11/4041 | |
| 2018/0177367 A1* | 6/2018 | Amaral | A47L 9/1641 | |
| 2018/0283019 A1* | 10/2018 | Telleria | B05C 5/02 | |
| 2018/0299899 A1* | 10/2018 | Suvarna | H04W 24/08 | |
| 2019/0011413 A1* | 1/2019 | Caussy | G01N 33/0006 | |
| 2019/0049962 A1* | 2/2019 | Ouellette | G01S 17/89 | |
| 2019/0200826 A1* | 7/2019 | Burbank | A47L 9/1472 | |
| 2019/0208979 A1* | 7/2019 | Bassa | A47L 11/4038 | |
| 2019/0212752 A1* | 7/2019 | Fong | A47L 9/2815 | |
| 2019/0213438 A1* | 7/2019 | Jones | A47L 9/009 | |
| 2019/0213755 A1* | 7/2019 | Bassa | G06K 9/00671 | |
| 2019/0248007 A1* | 8/2019 | Duffy | A47L 1/00 | |
| 2019/0258262 A1* | 8/2019 | Vicenti | A47L 11/4061 | |

* cited by examiner

US 10,732,127 B2

DIRTINESS LEVEL DETERMINING SYSTEM AND SURFACE CLEANING MACHINE

CROSS REFERENCE TO RELATED APPLICATIONS

This application is a continuation in part of applicant's earlier application, Ser. No. 15/427,067, filed Feb. 8, 2017 and is included herein by reference.

BACKGROUND OF THE INVENTION

1. Field of the Invention

The present invention relates to a dirtiness level determining system a surface cleaning machine using the dirtiness level determining system, and particularly relates to a dirtiness level determining system a surface cleaning machine using the dirtiness level determining system which can provide a variety of cleaning surface conditions to the user.

2. Description of the Prior Art

Following the development of techniques, optical mice gradually substitutes conventional mice. Accordingly, the user cares a lot for the movement quality (ex. sensitivity or accuracy) of the optical mouse. Particularly, in some specific situations (ex. game competition), a high level of movement quality is needed.

However, a conventional optical mouse does not automatically show a movement quality thereof, thus complicated software is needed to determine if the movement quality of the optical mouse falls in a predetermined range. Accordingly, the detecting for movement quality of optical mice needs much time. If a user managing a plurality of optical mice, for example, an internet cafe manager, needs to spend a lot of time and effort to check movement quality of optical mice.

Further, a surface clean machine becomes more and more popular in recent years. However, a conventional surface clean machine only can clean a cleaning surface but cannot show the dirtiness level or related information of a cleaning surface.

SUMMARY OF THE INVENTION

Therefore, one objective of the present invention is to provide a dirtiness level determining system which can provide dirtiness level information and related information of a cleaning surface.

Another objective of the present invention is to provide a surface cleaning machine which can provide dirtiness level information and related information of a cleaning surface.

One embodiment of the present invention discloses a dirtiness level determining system of a surface cleaning machine, comprising: an optical information generating circuit, configured to generate optical information; a feature level determining circuit, configured to determine an optical feature level of the optical information; and a reminding message generating circuit, configured to generate at least one dirtiness level reminding message according to a relation between the optical feature level and a feature threshold level when light from the surface cleaning machine can reach the cleaning surface and the optical information can be generated based on the light from the surface cleaning machine; wherein the dirtiness level reminding message is adapted to indicate a cleaning status of the cleaning surface, and the cleaning status includes at least one parameter of: a dirtiness level of the cleaning surface, a dirtiness location of the cleaning surface, and an air quality of a room where the cleaning surface locates in.

Another embodiment of the present invention discloses a surface cleaning machine comprising the above-mentioned dirtiness level determining system.

In view of the above-mentioned embodiments related with a surface cleaning machine, the user can know a variety conditions of the cleaning surface or the air while the surface cleaning machine performing a clean operation.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, several embodiments are provided to explain the concept of the present invention. Please note, the components illustrated in following embodiments, such as a system, a module, or a unit, can be implemented via hardware (ex. circuit), and can be implemented via hardware with software (ex. a program installed to a processor). Further, the components illustrated in each embodiment can be separated to more components and can be integrated to fewer components.

Figure 1:
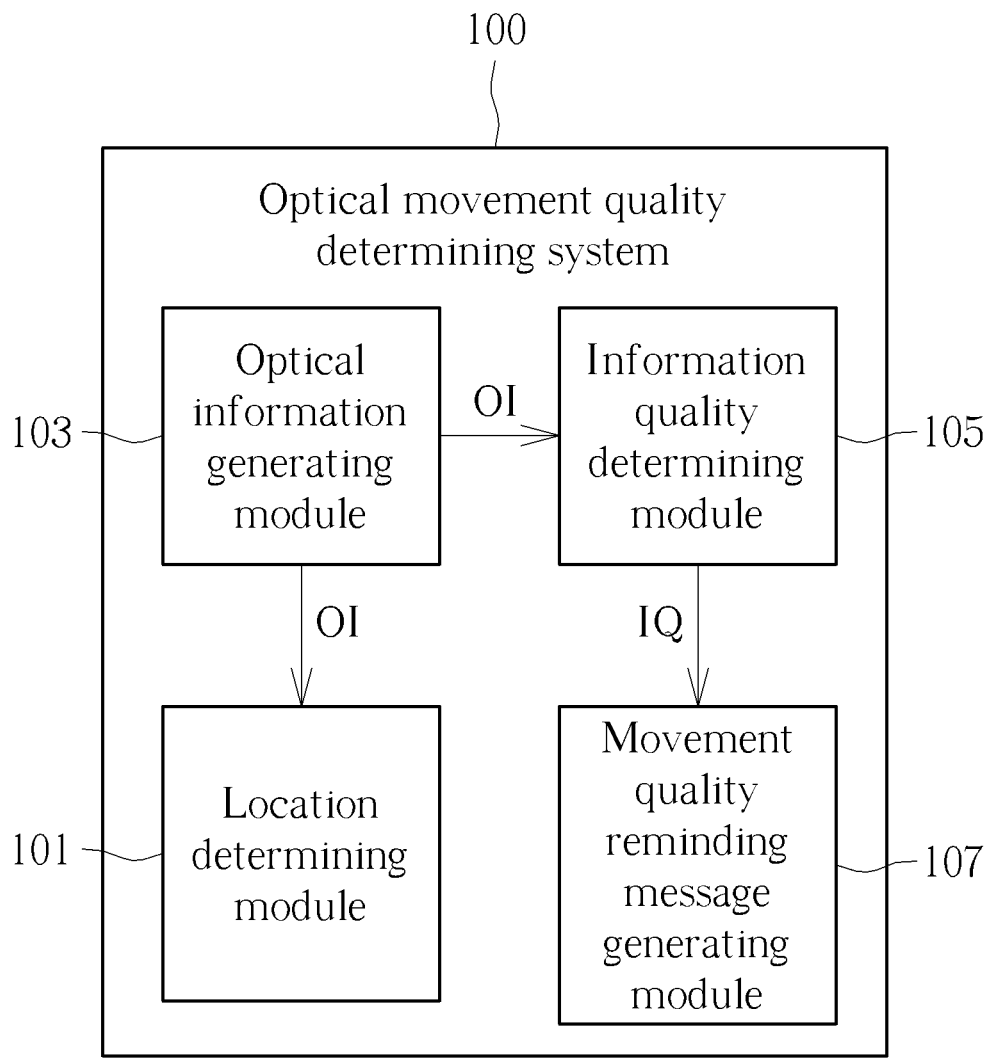
FIG. 1 is a block diagram illustrating an optical movement quality determining system according to one embodiment of the present invention.

FIG. 1 is a block diagram illustrating an optical movement quality determining system according to one embodiment of the present invention. As illustrated in FIG. 1, the optical movement quality determining system 100 comprises a location determining module 101, an optical information generating module 103, an information quality determining module 105 and a movement quality reminding message generating module 107. The optical information generating module 103 is provided in an optical movement detecting apparatus, configured to generate optical information OI. The location determining module 101 determines a relative location between an object and the optical movement detecting apparatus according to the optical information OI. The information quality determining module 105 is configured to determine information quality IQ of the optical information OI. The movement quality reminding message generating module 107 is configured to generate at least one movement quality reminding message according to a relation between the information quality IQ and a quality threshold value. The movement quality reminding message can be light, a voice, or images, such that the user can acquire a movement quality of the optical movement detecting apparatus.

In one embodiment, the above-mentioned optical information generating module 103 is an image sensor, and the optical information OI is a sensing image captured by the optical information generating module 103. In such example, the information quality IQ is image quality for sensing images. Also, the optical movement detecting apparatus can be an optical navigating apparatus (ex. an optical mouse) or an optical touch control apparatus. Besides, the above-mentioned object can be a finger or a surface, such as a desk surface that the optical mouse is provided on. Related contents will be described for more detail below. In this embodiment, since the relative location between the object and the optical movement detecting apparatus is based on the sensing images, the quality for sensing images is directly proportional to the movement quality of the optical movement detecting apparatus. However, the image quality may be affected by various kinds of factors. For example, a dirty condition for the surface that the optical movement detecting apparatus is put on, or a dirty condition for a lens which the image sensor applies to capture sensing images.

Many methods can be applied to compute image quality of sensing images. In one embodiment, a number for decreasing or increasing for grey levels of neighboring pixels in each row of a sensing image is computed, and such result is multiplied by a weighting value to acquire an image quality parameter IP. The higher the image quality parameter IP, the better the image quality is. The reason for why the image quality can be determined by this way is: the image is clear if the image has a better image quality, thus variation for the grey levels of neighboring pixels is more obvious. On the opposite, the image is blurred if the image has a poor image quality, thus variation for the grey levels of neighboring pixels is non-obvious.

In another embodiment, the sensing image is firstly processed by a filter to filter noise in the sensing image. After that, each of the pixel grey levels for the sensing image is compared with a predetermined value, which has a larger value (i.e. brighter, such as 180). If the pixel grey level is lower than the predetermined value, a counting value of the counter increases by 1. The lower the counting value, the better the image quality is. The reason for why the image quality can be determined by this way is: a sensing image having better image quality always has a dark region image, rather than the whole sensing image is bright. Oppositely, if almost the whole sensing image is bright, it means the image is blurred and has a poor image quality.

Figure 2:
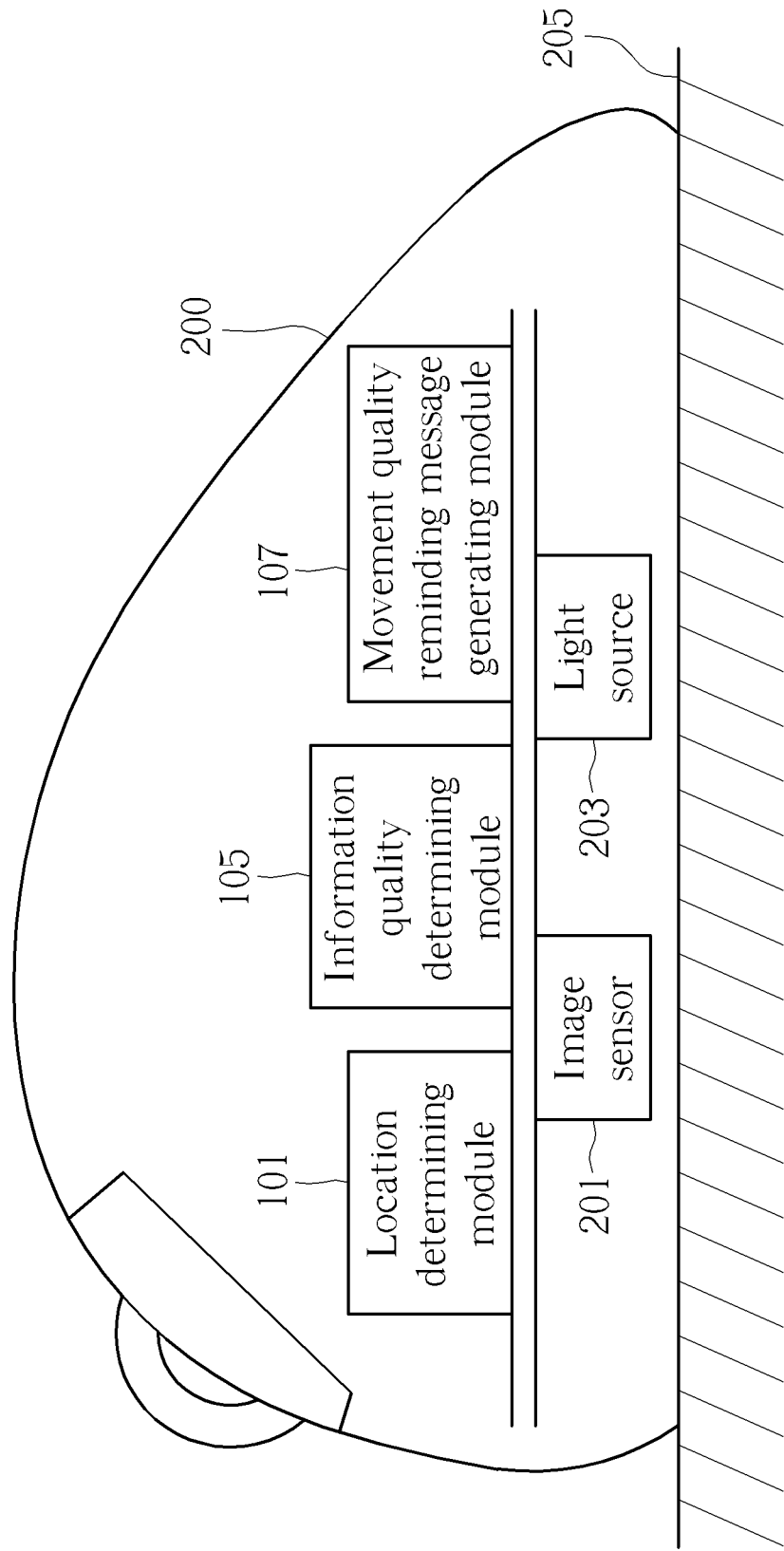
FIG. 2 is a schematic diagram illustrating an optical mouse applying the optical movement quality determining system illustrated in FIG. 1.

FIG. 2 is a schematic diagram illustrating an optical mouse applying the optical movement quality determining system illustrated in FIG. 1. As illustrated in FIG. 2, the optical information generating module 103 in FIG. 1 is implemented by an image sensor 201 in FIG. 2. The light source 203 provides light to a surface 205 (ex. a desk surface that the optical mouse 200 is put on). The image sensor 201 is configured to capture a sensing image comprising an image for the surface 205. The location determining module 101 determines a relative location between the surface 205 (i.e. the above-mentioned object) and the optical mouse 200 according to the sensing images captured by the image sensor 201. The information quality determining module 105 is configured to determine image quality of the sensing image captured by the image sensor 201. The movement quality reminding message generating module 107 is configured to generate at least one movement quality reminding message according to a relation between the image quality and a quality threshold value.

Figure 3:
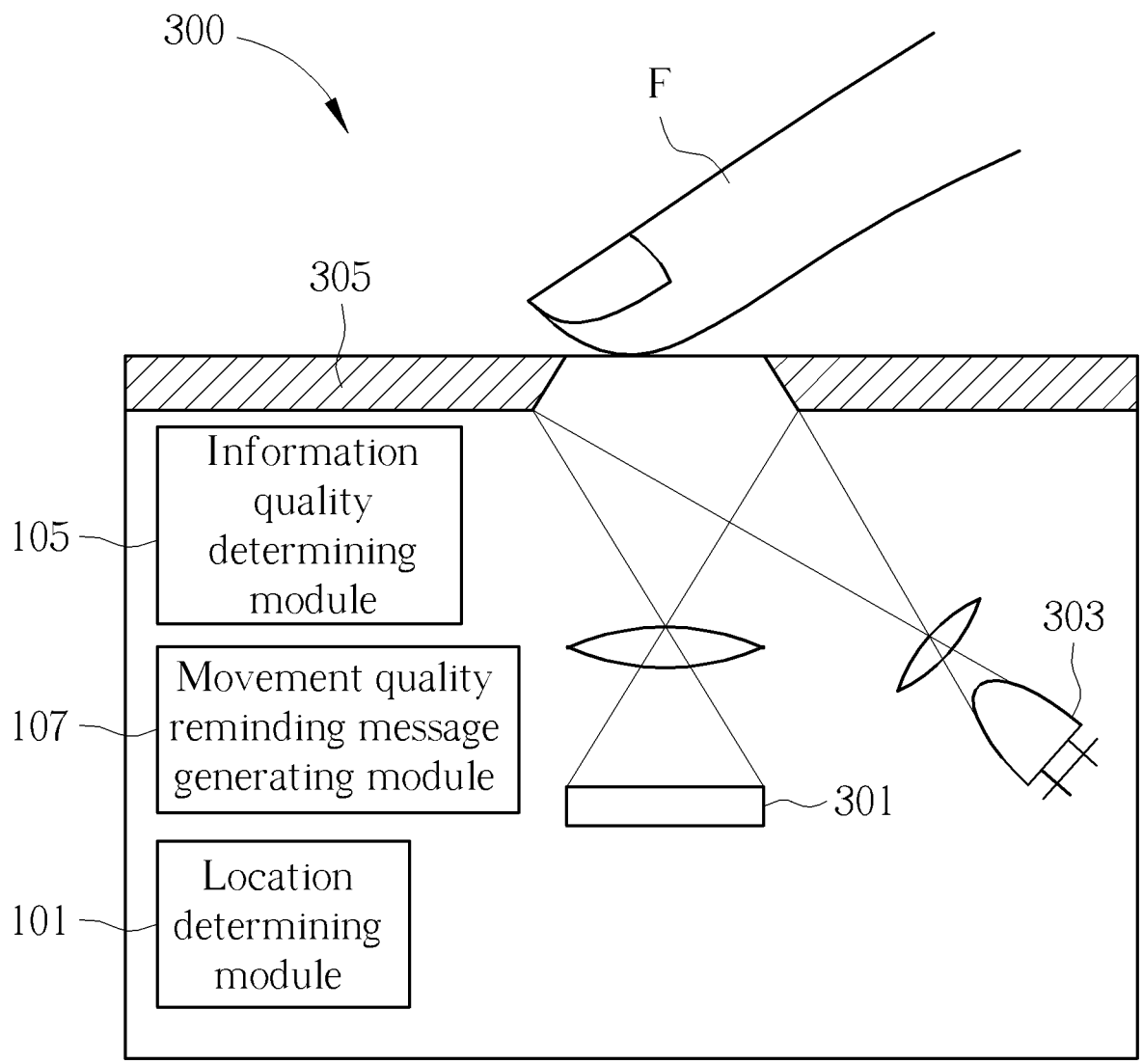
FIG. 3 is a schematic diagram illustrating an optical touch control apparatus applying the optical movement quality determining system illustrated in FIG. 1.

Besides the optical mouse illustrated in FIG. 2, the optical movement quality determining system 100 illustrated in FIG. 1 can be applied to an optical touch control apparatus. FIG. 3 is a schematic diagram illustrating an optical touch control apparatus 300 applying the optical movement quality determining system illustrated in FIG. 1. As illustrated in FIG. 3, the optical information generating module 103 in FIG. 1 is implemented by an image sensor 301 in FIG. 3. The light source 303 provides light to a finger F on a sensing surface 305. The image sensor 301 is configured to capture a sensing image comprising an image for the finger F. The location determining module 101 determines a relative location between the finger F (i.e. the above-mentioned object) and the sensing surface 305 according to the sensing images captured by the image sensor 301. The information quality determining module 105 is configured to determine image quality of the sensing image captured by the image sensor 301. The movement quality reminding message generating module 107 is configured to generate at least one movement quality reminding message according to a relation between the image quality and a quality threshold value.

Please note, the optical information generating module 103 in FIG. 1 can be applied to an optical navigating apparatus or an optical touch control apparatus, which have structures different from structures illustrated in FIG. 2 and FIG. 3. In following descriptions, different embodiments are provided to explain the above-mentioned movement quality reminding message. It will be appreciated although an optical mouse is used as an example to explain following embodiments, the following embodiments can be applied to an optical touch control apparatus as well.

Figure 4:
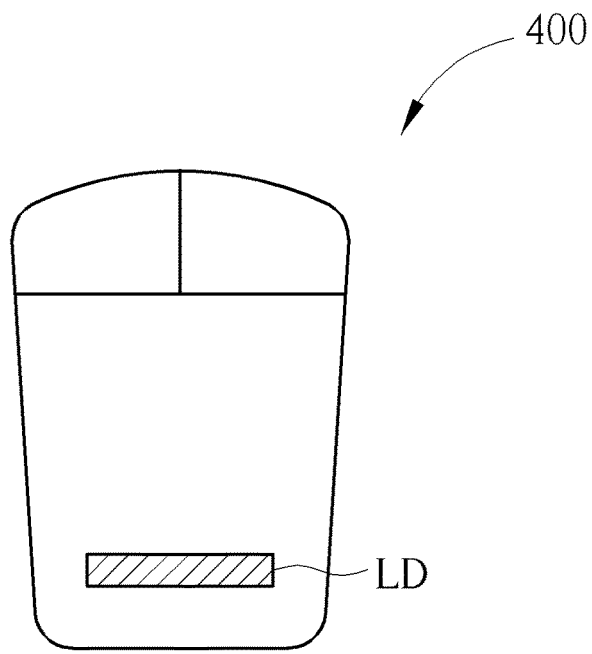
FIG. 4 is a schematic diagram illustrating an optical movement quality determining method according to one embodiment of the present invention.

FIG. 4 is a schematic diagram illustrating an optical movement quality determining method according to one embodiment of the present invention. In one embodiment, the movement quality reminding message is light from at least one light emitting device. As illustrated in FIG. 4, the optical mouse 400 comprises a light emitting device LD, which emits light according to the above-mentioned relation between the information quality and the quality threshold value. In one embodiment, if the information quality is lower than quality threshold value, which means the movement quality is poor, the light emitting device LD emits light, to remind the user to check the optical mouse 400 or a surface on which the optical mouse moves. In another embodiment, if the information quality is not lower (i.e. higher or equal) than quality threshold value, which means the movement quality is in an acceptable range, the light emitting device LD emits light. In such embodiment, the light emitting device LD stops emitting light if the information quality is lower than quality threshold value, to remind the user to check the optical mouse 400 or a surface on which the optical mouse moves.

In one embodiment, the information quality has a plurality of sates, and the movement quality reminding message correspondingly comprises different messages. Take FIG. 4 for example, the information quality can have three levels: high, medium and low. The light emitting device LD emits green light if the information quality is high, the light emitting device LD emits yellow light if the information quality is medium, and the light emitting device LD emits red light if the information quality is low. In another embodiment, the light emitting device LD emits orange light if the information quality determining module determines a plurality of sensing images are too dark. Also, in the same embodiment, the light emitting device LD emits purple light if the information quality determining module determines a plurality of sensing images have low contrasts. By this way, the user can efficiently determine information quality for the optical mouse. Such embodiment can be summarized as: The movement quality reminding message comprises a first mode reminding message and a second mode reminding message. The movement quality reminding message generating module generates the first mode reminding message if the information quality is a first state. Also, the movement quality reminding message generating module generates the second mode reminding message if the information quality is a second state.

Figure 5:
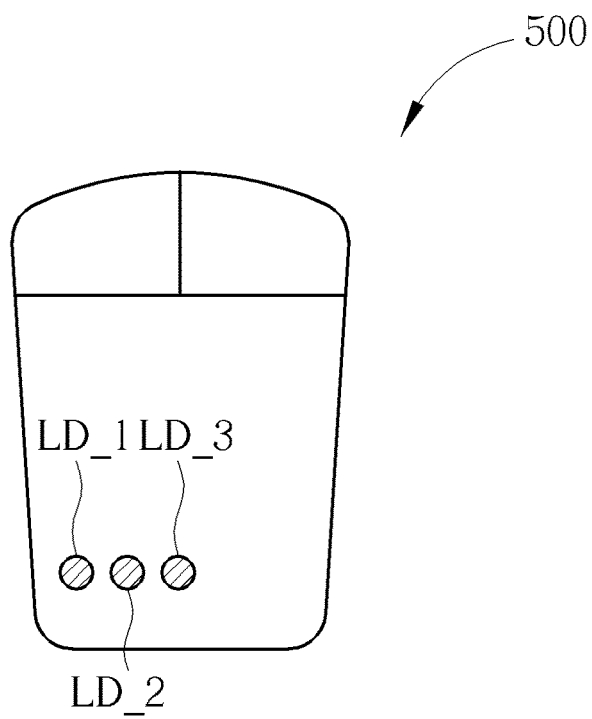
FIG. 5 is a schematic diagram illustrating an optical movement quality determining method according to another embodiment of the present invention.

The above-mentioned optical device is not limited to only one optical device. As illustrated in FIG. 5, the optical mouse 500 comprises a plurality of light emitting devices LD_1, LD_2 and LD_3. The operations for the light emitting devices LD_1, LD_2 and LD_3 are the same as the operations illustrated in FIG. 4. That is, in one embodiment, at least one of the light emitting devices LD_1, LD_2 and LD_3 emits light if the information quality is lower than the quality threshold value (i.e. the movement quality is poor). In another embodiment, at least one of the light emitting devices LD_1, LD_2 and LD_3 emits light if the information quality is not lower than the quality threshold value, and at least one of the light emitting devices LD_1, LD_2 and LD_3 stops emitting light if the information quality is lower than the quality threshold value. Similarly, the embodiment in FIG. 5 can apply the above-mentioned embodiment" the information quality has a plurality of sates, and the movement quality reminding message correspondingly comprises different messages." For example, the information quality can have three levels: high, medium and low. Only the light emitting device LD_1 emits light if the information quality is high, the light emitting devices LD_1, LD_2 emits light if the information quality is medium, and all the light emitting devices LD_1, LD_2, LD_3 emits light if the information quality is low. In another embodiment, the light emitting device LD_1 emits light if the information quality determining module determines a plurality of sensing images are too dark. Also, in the same embodiment, the light emitting devices LD_1, LD_2 emit plight if the information quality determining module determines a plurality of sensing images have low contrasts. By this way, the user can efficiently determine information quality for the optical mouse.

Figure 6:
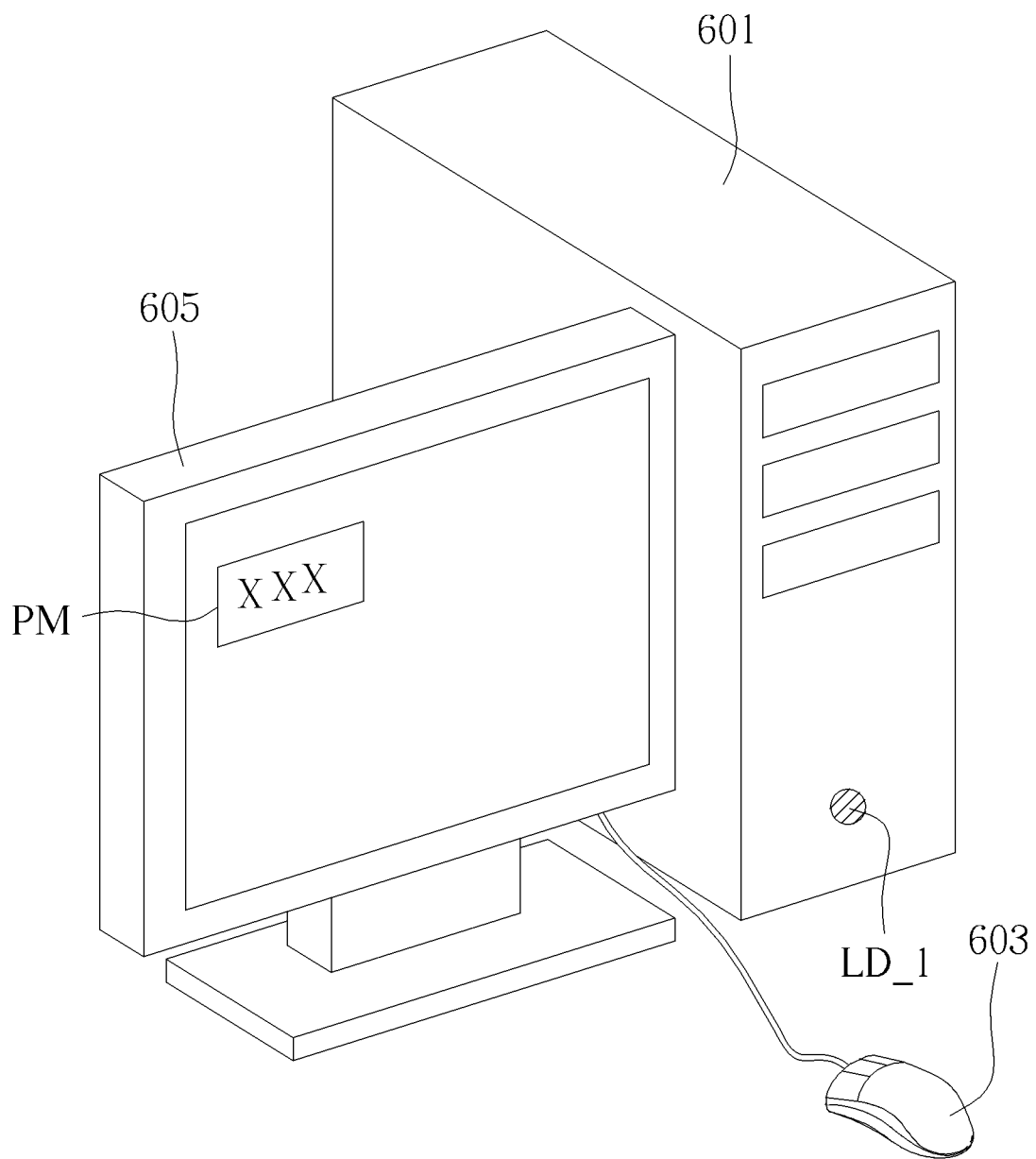
FIG. 6 is a schematic diagram illustrating a movement quality reminding message according to one embodiment of the present invention.

In above-mentioned embodiments, the light emitting devices are all provided in the optical mouse, but the light emitting devices are provided in apparatuses besides the optical mouse. Take FIG. 6 for example, the light emitting device LD_1 is provided in the host 601, and the optical mouse 603 is coupled to the host 601 via wire-connection, or wireless-connection. The host 601 performs different operations corresponding to control signals from the optical mouse 603. For example, the cursor on the display can move corresponding to the movement of the optical mouse 601. In such embodiment, the optical mouse 603 still comprises the above-mentioned optical information generating module and the information quality determining module. Also, the light emitting device LD_1 on the host 601 emits light according to a relation between information quality generated by the information quality determining module and a quality threshold value.

In one embodiment, the host 601 and the optical mouse 603 both comprise light emitting devices, which simultaneously emit light or not according to relation between information quality generated by the information quality determining module and a quality threshold value. By this way, the user can be efficiently reminded that the optical mouse 603 may have a poor movement quality.

In above-mentioned embodiments, the light is applied as the movement quality reminding message. However, the movement quality reminding message can by other types of messages. For example, in one embodiment the movement quality reminding message is a voice. In another embodiment, the movement quality reminding message is a message that can be displayed, such as the movement quality reminding message PM, which is displayed on a display 605 and can be a character message or an image message.

Please note persons skilled in the art can combine or modify the above-mentioned embodiments. Such variation should also fall in the scope of the present invention. The above-mentioned embodiments can be summarized as an optical movement quality determining method applied to an optical movement detecting apparatus configured to generate optical information (ex. sensing image) and to determine a relative location between an object and the optical movement detecting apparatus. The optical movement quality determining method comprises: (a) determining information quality of the optical information; and (b) generating at least one movement quality reminding message according to a relation between the information quality and a quality threshold value. The optical movement quality determining method can be performed via a computer readable recording medium, but not limited. For example, a program is stored to an optical disc or a storage device, the above-mentioned method can be performed if the program is executed.

Concept similar with which disclosed in above-mentioned embodiments can be applied to other types of electronic devices. In one embodiment, the concept disclosed in above-mentioned embodiments are applied to a surface cleaning machine (or named an auto clean machine), which can automatically clean a cleaning surface according to a user's instructions.

Figure 7:
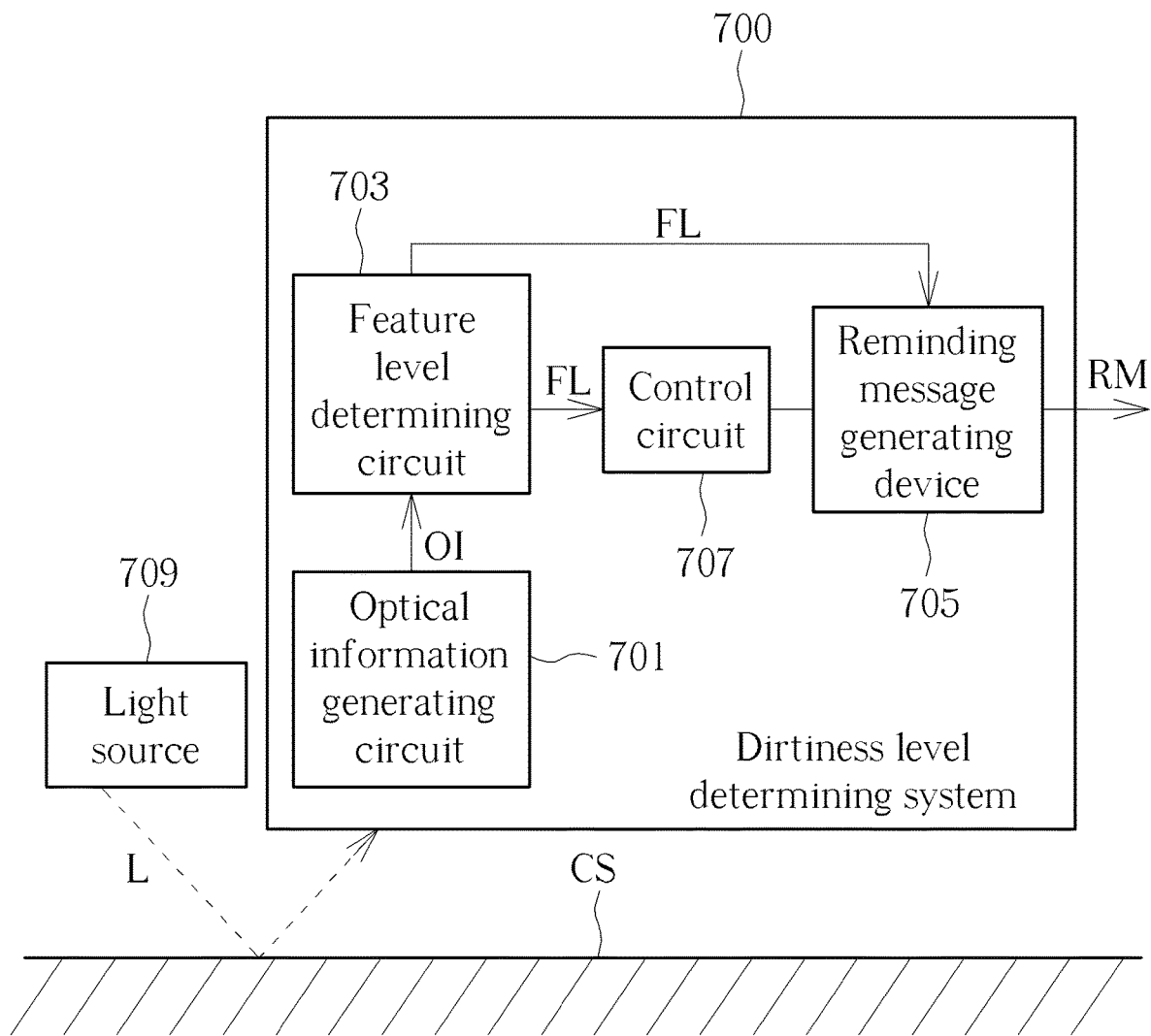
FIG. 7 is a block diagram illustrating a dirtiness level determining system according to one embodiment of the present invention.

FIG. 7 is a block diagram illustrating a dirtiness level determining system 700 according to one embodiment of the present invention. As illustrated in FIG. 7, the dirtiness level determining system 700 comprises an optical information generating circuit 701 a feature level determining circuit 703, a reminding message generating device 705 and a control circuit 707. The optical information generating circuit 701 senses optical information OI generated according to light L, which is from a light source 709. The cleaning surface CS can be any kind of surface, such as a ground or a surface of furniture. The feature level determining circuit 703 is configured to determine an optical feature level FL of the optical information OI. In one embodiment, the optical information generating circuit 701 is an image sensor, the optical information OI is an image, and the feature level determining circuit 703 determines the image features to generate the optical feature level FL, but not limited. The image feature can be, for example, at least one pixel having higher or lower pixel values, or an image part having a specific shape. In one embodiment, a high optical feature level means the image feature is obvious. On the opposite, a low optical feature level means the image feature is non-obvious.

The reminding message generating device 705 is configured to generate at least one dirtiness level reminding message RM according to a relation between the optical feature level FL and a feature threshold level. The dirtiness level reminding message RM can be light, a voice, or an image, or any combination thereof. The dirtiness level reminding message RM can be directly shown on the surface cleaning machine, or be transmitted to an electronic device can communicate with the surface cleaning machine (e.g. a mobile phone or a tablet computer).

The dirtiness level reminding message RM is adapted to indicate a cleaning status of the cleaning surface, and the cleaning status includes at least one parameter of: a dirtiness level of the cleaning surface CS, a dirtiness location of the cleaning surface CS, and an air quality of a room where the cleaning surface CS locates in. The dirtiness level of the cleaning surface CS means how dirty the cleaning surface is. For example, the more the hair or the dust on the cleaning surface CS, the higher the dirtiness level is. Also, the dirtiness location means a location of a fixed dirty area exists on the cleaning surface CS, and the air quality means the air quality determined according to the optical information OI. The dirtiness location and the air quality will be described for more detail later.

The control circuit 707 is configured to control the components in the dirtiness level determining system 700. Also, the control circuit 707 can analyze the feature level FL to determine some situations related with the feature level FL. The feature level determining circuit 703 can be integrated to the control circuit 707. Also, the above-mentioned feature threshold level can be adjusted by a user, to meet different requirements. The feature threshold level can be adjusted, for example, via a remote controller, a smart electronic device installed with a corresponding app, or via a control panel provided on a surface cleaning machine comprising the dirtiness level determining system 700.

Figure 8:
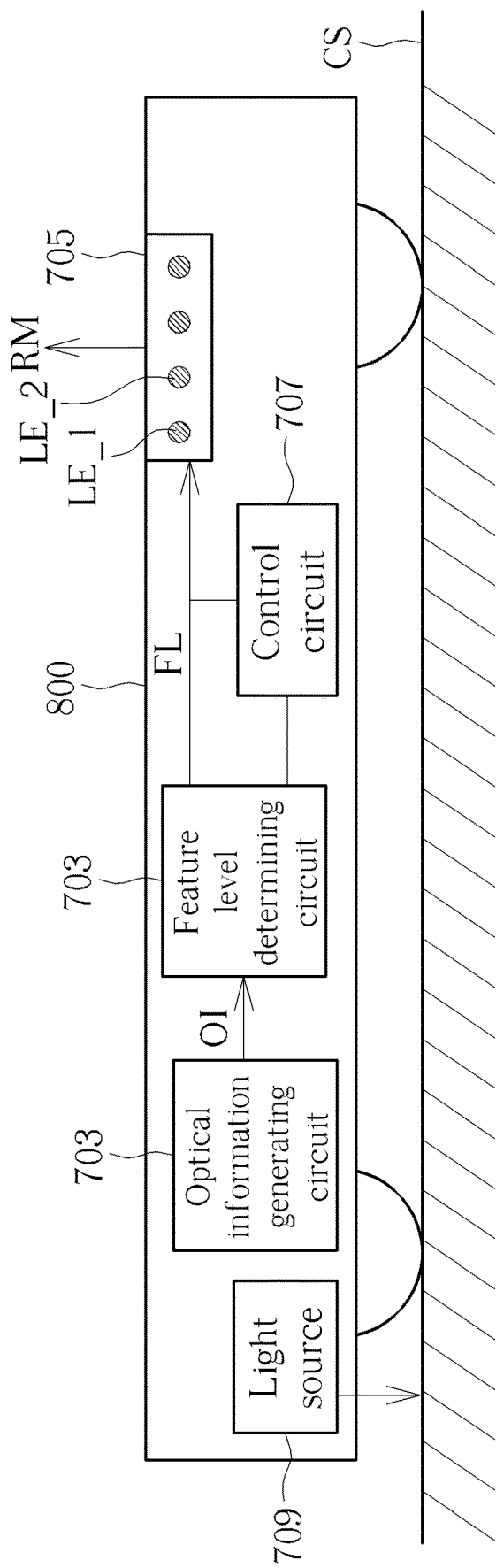
FIG. 8 is a schematic diagram illustrating a surface cleaning machine according to one embodiment of the present invention.

FIG. 8 is a schematic diagram illustrating a surface cleaning machine according to one embodiment of the present invention. Please note in the example of FIG. 8, the above-mentioned dirtiness level determining system 700 is provided in a surface cleaning machine 800, but only a portion of the components in the dirtiness level determining system 700 and the surface cleaning machine 800 are illustrated in FIG. 8, for the convenience of explaining.

As illustrated in FIG. 8, the surface cleaning machine 800 is put on a cleaning surface CS, which is a ground in this example. The light source 709 emits light L to the cleaning surface CS, and the optical information generating circuit 701 generates optical information OI according to the light L. The feature level determining circuit 703 determines the optical feature level FL of the optical information OI. Also, the reminding message generating device 705 generates the dirtiness level reminding message RM according to a relation between the optical feature level FL and a feature threshold level. In the embodiment of FIG. 8, the reminding message generating device 705 comprises at least one LED LE_1, LE_2 . . . and the LEDs emit light as the dirtiness level reminding message RM.

The control circuit 707 can be the control circuit (e.g. processor) of the surface cleaning machine 800. In such embodiment, the control circuit 707 is dependent from the dirtiness level determining system 700 rather than included in the dirtiness level determining system 700.

In one embodiment, the optical information OI is generated based on light from a first light source in the surface cleaning machine. The optical feature level FL of the optical information OI generated based on the light from the first light source is proportional to a dirtiness level of the cleaning surface CS. The first light source can be, for example, an LED (light emitting diode). On the contrary, in another embodiment, the optical information OI is generated based on light from a second light source in the surface cleaning machine. The optical feature level FL of the optical information OI generated based on the light from the second light source is inversely proportional to a dirtiness level of the cleaning surface CS. The second light source can be, for example, a LD (laser diode).

Figure 9:
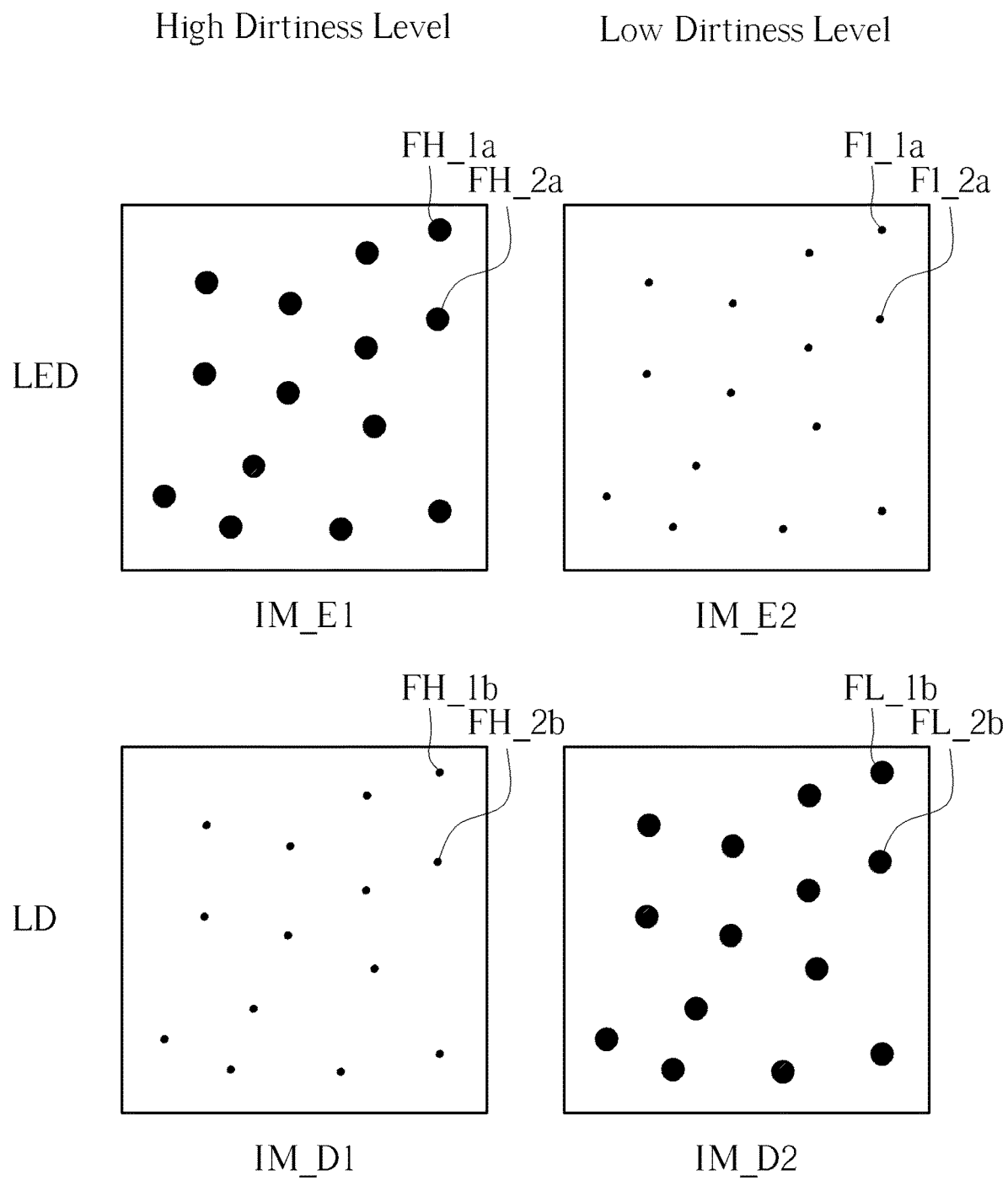
FIG. 9 is a schematic diagram illustrating the image feature levels for different types of light sources.

FIG. 9 is a schematic diagram illustrating the image feature levels for different types of light sources. As illustrated in FIG. 9, if the dirtiness level is high, the image IM_E1 generated according to the light from an LED has obvious image features due the dust, such as the image features FH_1a, FH_2a. However, if the dirtiness level is low, the image IM_E2 generated according to the light from an LED has non-obvious image features for the dust, such as the image features FL_1a, FL_2a. Accordingly, the image IM_E1 has a high image feature level and the image IM_E2 has a low image feature level. On the contrary, if the dirtiness level is high, the image IM_D1 generated according to the light from an LD has non-obvious image features for the dust, such as the image features FH_1b, FH_2b. However, if the dirtiness level is low, the image IM_D2 generated according to the light from an LD has obvious image features for the dust, such as the image features FL_1b, FL_2b. Accordingly, the image IM_E1 has a low image feature level and the image IM_E2 has a high image feature level. It will be appreciated that the above-mentioned first light source and the second light source are not limited to an LED and an LD.

Figure 10:
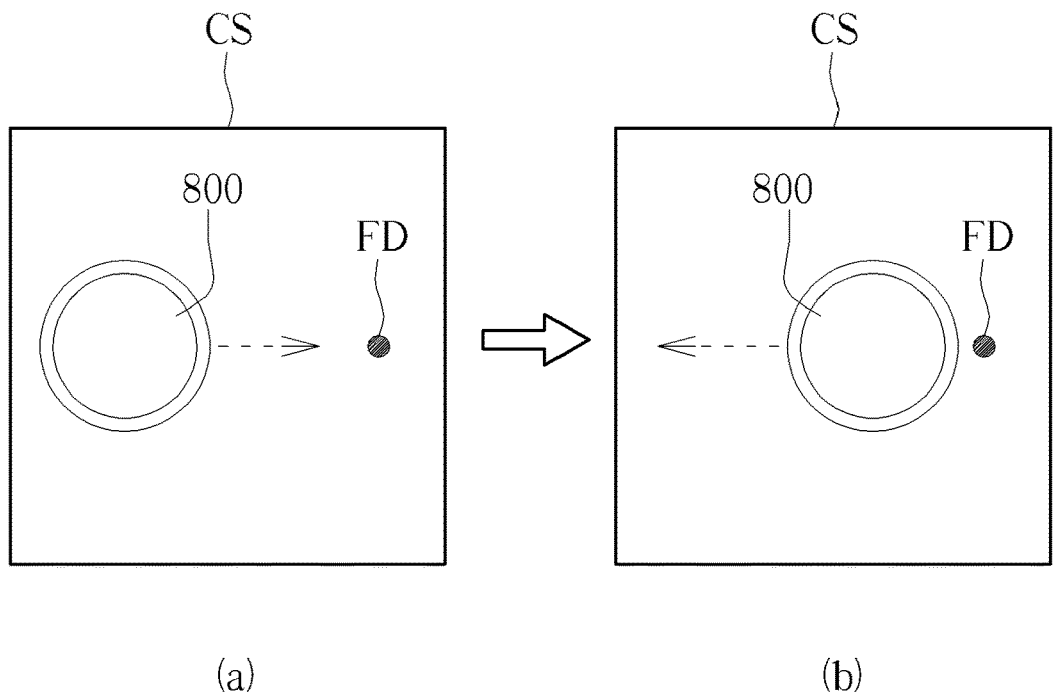
FIG. 10 and FIG. 11 are schematic diagrams illustrating operations for the surface cleaning machine according to different embodiments of the present invention.
Figure 11:
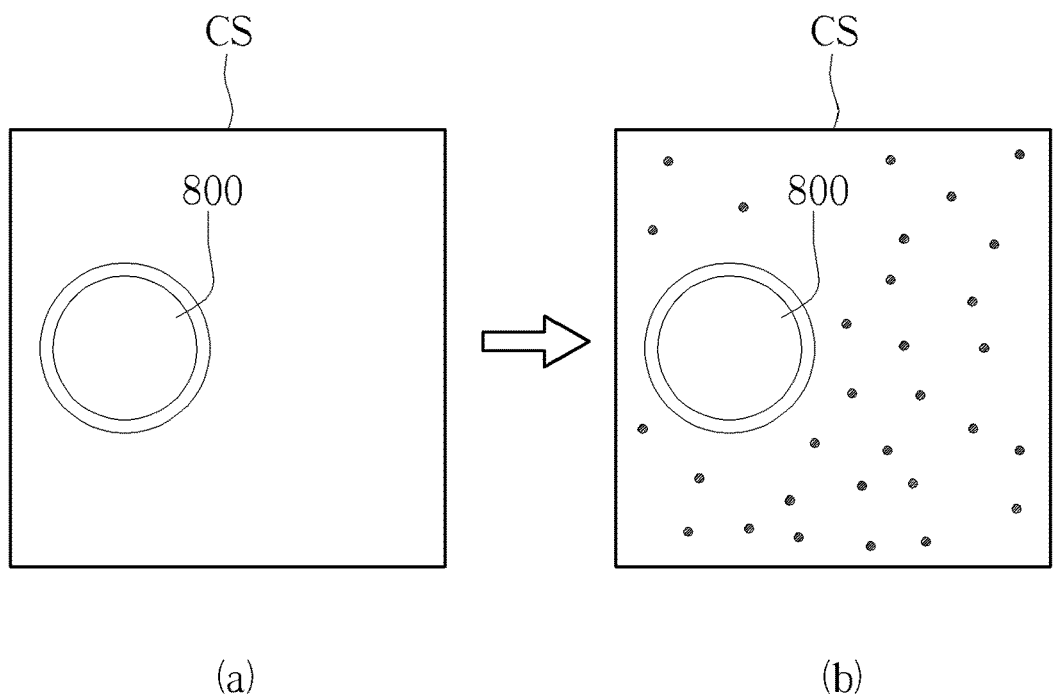

FIG. 10 and FIG. 11 are schematic diagrams illustrating operations of the surface cleaning machine according to different embodiments of the present invention. FIG. 10 is an example illustrating operations related with the above-mentioned parameter "a dirtiness location of the cleaning surface", and FIG. 11 is an example illustrating operations related with the above-mentioned parameter" an air quality of a room where the cleaning surface locates in". The room here can mean a physical room such as a bedroom or living room, but also can be the space in a range of the surface cleaning machine.

As illustrated in the FIG. (a) of FIG. 10, the surface cleaning machine 800 firstly moves to the right on the cleaning surface CS and cleans a passing area thereof. However, the fixed dirty area FD could not be cleaned by the surface cleaning machine 800 since it may have viscous substance or other substances which are hard to be cleaned. The control circuit 707 of the surface cleaning machine 800 can determine the fixed dirty area FD exists according to optical information OI (e.g. continuous images) while the surface cleaning machine 800 passes through the fixed dirty area FD for the first time. In such case, the location of the fixed dirty area FD is recorded by the control circuit 707.

Also, in the FIG. (b) of FIG. 10, the surface cleaning machine 800 turns back and moves to the left. The control circuit 707 of the surface cleaning machine 800 will determine the fixed dirty area FD still exists according to optical information OI while the surface cleaning machine 800 passes through the fixed dirty area FD again. In such case, the control circuit 707 controls the reminding message generating circuit 705 to generate the dirtiness level reminding message RM with a parameter of "a dirtiness location of the cleaning surface" to inform the user that a dirty region which could not be cleaned by the surface cleaning machine 800 exists. In one embodiment, the surface cleaning machine 800 may stop near the fixed dirty area FD and generates the dirtiness level reminding message RM, such that the user can easily find the fixed dirty area FD. In another embodiment, the surface cleaning machine 800 may generate a map of the region which the surface cleaning machine 800 is cleaning, and transmits a map with a mark representing the fixed dirty area FD to a portable electronic device of the user.

In the FIG. (a) of FIG. 11, the surface cleaning machine 800 cleans a specific area of the cleaning surface CS and records a time point at which the clean operation of the specific area is completed. The specific area here can mean the whole cleaning surface CS or only a portion of the cleaning surface CS, depending on the setting of the surface cleaning machine 800. For example, if the cleaning surface CS is a ground of a bed room, the specific area can mean the whole ground or only a portion of the ground. After a predetermined period of time (e.g. one day or 8 hours), in FIG. (b) of FIG. 11, the surface cleaning machine 800 may perform the clean operation again. In such case, if the control circuit 707 determines the dirtiness level of the specific area of the cleaning surface increases for a predetermined level (i.e. higher than the dirtiness level in FIG. (a) of FIG. 11) according to the optical information OI, the control circuit 707 controls the reminding message generating circuit 705 to generate dirtiness level reminding message RM with a parameter of "an air quality of a room where the cleaning surface locates in" to inform the user that the air quality of the room is below an air quality threshold level.

Conventionally, if the user does not have an air purifier or an air quality detector, the user could not know the air quality in the room. However, if the air quality is poor, the dirtiness level of a large portion of the cleaning surface CS may increase in a short time, thus the air quality can be detected via the operations illustrated in FIG. 11.

In view of the above-mentioned embodiments related with a surface cleaning machine, the user can know various conditions of the cleaning surface or the air while the surface cleaning machine performing a clean operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dirtiness level determining system of a surface cleaning machine, comprising:
   an optical information generating circuit, configured to generate optical information;
   a feature level determining circuit, configured to determine an optical feature level of the optical information; and
   a reminding message generating circuit, configured to generate at least one dirtiness level reminding message according to a relation between the optical feature level and a feature threshold level when light from the surface cleaning machine can reach a cleaning surface outside the surface cleaning machine and the optical information can be generated based on the light reaching the cleaning surface;
   wherein the dirtiness level reminding message is adapted to indicate a cleaning status of the cleaning surface, and the cleaning status includes at least one parameter of: a dirtiness level of the cleaning surface, a dirtiness location of the cleaning surface, and an air quality of a room where the cleaning surface locates in.

2. The dirtiness level determining system of claim 1, wherein the reminding message generating circuit generates the dirtiness level reminding message indicating a fixed dirty area exists on the cleaning surface, if a control circuit of the surface cleaning machine determines the fixed dirty area still exists according to the optical information after the surface cleaning machine cleans the fixed dirty area.

3. The dirtiness level determining system of claim 1, wherein the reminding message generating circuit generates the dirtiness level reminding message indicating the air quality of the room is below an air quality threshold level, if a control circuit of the surface cleaning machine determines the dirtiness level of a specific area of the cleaning surface increases according to the optical information after the surface cleaning machine cleans the specific area for a predetermined period of time.

4. The dirtiness level determining system of claim 1, wherein the feature threshold level can be adjusted by a user.

5. The dirtiness level determining system of claim 1, wherein the optical information comprises at least one image and the optical feature level is an image feature level of the image.

6. The dirtiness level determining system of claim 1, wherein the optical information is generated based on light from a first light source in the surface cleaning machine, wherein the optical feature level of the optical information generated based on the light from the first light source is proportional to a dirtiness level of the cleaning surface;
   wherein the reminding message generating circuit generates the dirtiness level reminding message which indicates a dirtiness level of the cleaning surface is above a dirtiness threshold level if the optical feature level is above or equal to the feature threshold level.

7. The dirtiness level determining system of claim 6, wherein the first light source is an LED.

8. The dirtiness level determining system of claim 1, wherein the optical information is generated based on light from a second light source in the surface cleaning machine, wherein the optical feature level of the optical information generated based on the light from the second light source is inversely proportional to a dirtiness level of the cleaning surface;
   wherein the reminding message generating circuit generates the dirtiness level reminding message which indicates a dirtiness level of the cleaning surface is above a dirtiness threshold level if the optical feature level is lower or equal to the feature threshold level.

9. The dirtiness level determining system of claim 8, wherein the first light source is a laser diode.

10. A surface cleaning machine, comprising:
    a light source;
    a dirtiness level determining system, comprising:
       an optical information generating circuit, configured to generate optical information according to light from the light source;
       a feature level determining circuit, configured to determine an optical feature level of the optical information; and
       a reminding message generating circuit, configured to generate at least one dirtiness level reminding message according to a relation between the optical feature level and a feature threshold level when light from the surface cleaning machine can reach a cleaning surface outside the surface cleaning machine and the optical information can be generated based on the light reaching the cleaning surface;

wherein the dirtiness level reminding message is adapted to indicate a cleaning status of the cleaning surface, and the cleaning status includes at least one parameter of: a dirtiness level of the cleaning surface, a dirtiness location of the cleaning surface, and an air quality of a room where the cleaning surface locates in.

11. The surface cleaning machine of claim 10, further comprising a control circuit, wherein the reminding message generating circuit generates the dirtiness level reminding message indicating a fixed dirty area exists on the cleaning surface, if the control circuit determines the fixed dirty area still exists according to the optical information after the surface cleaning machine cleans the fixed dirty area.

12. The surface cleaning machine of claim 10, further comprising a control circuit, wherein the reminding message generating circuit generates the dirtiness level reminding message indicating the air quality of the room is below an air quality threshold level, if the control circuit determines the dirtiness level of a specific area of the cleaning surface increases according to the optical information after the surface cleaning machine cleans the specific area for a predetermined period of time.

13. The surface cleaning machine of claim 10, wherein the feature threshold level can be adjusted by a user.

14. The dirtiness level determining system of claim 10, wherein the optical information comprises at least one image and the optical feature level is an image feature level of the image.

15. The surface cleaning machine of claim 10,
wherein the optical feature level of the optical information generated based on the light from the light source is proportional to a dirtiness level of the cleaning surface;
wherein the reminding message generating circuit generates the dirtiness level reminding message which indicates a dirtiness level of the cleaning surface is above a dirtiness threshold level if the optical feature level is above or equal to the feature threshold level.

16. The surface cleaning machine of claim 15, wherein the first light source is an LED.

17. The surface cleaning machine of claim 10,
wherein the optical feature level of the optical information generated based on the light from the light source is inversely proportional to a dirtiness level of the cleaning surface;
wherein the reminding message generating circuit generates the dirtiness level reminding message which indicates a dirtiness level of the cleaning surface is above a dirtiness threshold level if the optical feature level is lower or equal to the feature threshold level.

18. The surface cleaning machine of claim 17, wherein the first light source is a laser diode.

19. A dirtiness level determining system of a surface cleaning machine, comprising:
an optical information generating circuit, configured to generate optical information;
a feature level determining circuit, configured to determine an optical feature level of the optical information; and
a reminding message generating circuit, configured to generate at least one dirtiness level reminding message according to a relation between the optical feature level and a feature threshold level when light from the surface cleaning machine can reach the cleaning surface and the optical information can be generated based on the light from the surface cleaning machine;
wherein the dirtiness level reminding message is adapted to indicate a cleaning status of the cleaning surface, and the cleaning status includes at least one parameter of: a dirtiness level of the cleaning surface, a dirtiness location of the cleaning surface, and an air quality of a room where the cleaning surface locates in;
wherein the optical information is generated based on light from a first light source in the surface cleaning machine, wherein the optical feature level of the optical information generated based on the light from the first light source is proportional to a dirtiness level of the cleaning surface;
wherein the reminding message generating circuit generates the dirtiness level reminding message which indicates a dirtiness level of the cleaning surface is above a dirtiness threshold level if the optical feature level is above or equal to the feature threshold level.

20. A surface cleaning machine, comprising:
a light source;
a dirtiness level determining system, comprising:
an optical information generating circuit, configured to generate optical information according to light from the light source;
a feature level determining circuit, configured to determine an optical feature level of the optical information; and
a reminding message generating circuit, configured to generate at least one dirtiness level reminding message according to a relation between the optical feature level and a feature threshold level when light from the surface cleaning machine can reach the cleaning surface and the optical information can be generated based on the light from the surface cleaning machine;
wherein the dirtiness level reminding message is adapted to indicate a cleaning status of the cleaning surface, and the cleaning status includes at least one parameter of: a dirtiness level of the cleaning surface, a dirtiness location of the cleaning surface, and an air quality of a room where the cleaning surface locates in;
wherein the optical feature level of the optical information generated based on the light from the light source is proportional to a dirtiness level of the cleaning surface;
wherein the reminding message generating circuit generates the dirtiness level reminding message which indicates a dirtiness level of the cleaning surface is above a dirtiness threshold level if the optical feature level is above or equal to the feature threshold level.

21. A surface cleaning machine, comprising:
a light source;
a dirtiness level determining system, comprising:
an optical information generating circuit, configured to generate optical information according to light from the light source;
a feature level determining circuit, configured to determine an optical feature level of the optical information; and
a reminding message generating circuit, configured to generate at least one dirtiness level reminding message according to a relation between the optical feature level and a feature threshold level when light from the surface cleaning machine can reach the cleaning surface and the optical information can be generated based on the light from the surface cleaning machine;

wherein the dirtiness level reminding message is adapted to indicate a cleaning status of the cleaning surface, and the cleaning status includes at least one parameter of: a dirtiness level of the cleaning surface, a dirtiness location of the cleaning surface, and an air quality of a room where the cleaning surface locates in;

wherein the optical feature level of the optical information generated based on the light from the light source is inversely proportional to a dirtiness level of the cleaning surface;

wherein the reminding message generating circuit generates the dirtiness level reminding message which indicates a dirtiness level of the cleaning surface is above a dirtiness threshold level if the optical feature level is lower or equal to the feature threshold level.

* * * * *